United States Patent [19]

Kitamura et al.

[11] Patent Number: 4,548,687

[45] Date of Patent: Oct. 22, 1985

[54] SEALANT COMPOSITIONS AND METHOD OF PRODUCING THE SAME

[75] Inventors: Takashi Kitamura, Higashimurayama; Yukio Fukuura, Kawagoe; Itsuo Tanuma, Sayama; Toshikazu Shinogaya, Kodaira; Yuji Noda, Kokubunji, all of Japan

[73] Assignee: Bridgestone Tire Company Limited, Tokyo, Japan

[21] Appl. No.: 490,085

[22] Filed: Apr. 29, 1983

[30] Foreign Application Priority Data

May 7, 1982 [JP] Japan ................................. 57-75497

[51] Int. Cl.$^4$ .......................... B32B 27/16; C08J 3/28
[52] U.S. Cl. ......................... 204/159.17; 204/159.15; 204/159.16; 523/166; 524/474; 524/533
[58] Field of Search ...................... 204/159.15, 159.17, 204/159.16; 523/166; 524/519, 521, 523, 474

[56] References Cited

U.S. PATENT DOCUMENTS

| | | | |
|---|---|---|---|
| 2,798,527 | 7/1957 | Kindle et al. ........................ | 523/166 |
| 3,676,381 | 7/1972 | Silverstein ........................... | 523/166 |
| 3,769,122 | 10/1973 | Coddington et al. ............... | 523/166 |
| 4,152,231 | 5/1979 | St. Clair et al. ................... | 204/159.17 |
| 4,227,979 | 10/1980 | Humke et al. ..................... | 204/159.16 |
| 4,263,075 | 4/1981 | Bowerman, Jr. et al. .......... | 523/166 |

FOREIGN PATENT DOCUMENTS 743147  1/1956  United Kingdom ............... 523/166

*Primary Examiner*—Allan M. Lieberman
*Attorney, Agent, or Firm*—Sughrue, Mion, Zinn, Macpeak, and Seas

[57] ABSTRACT

A sealant composition for the puncture-sealing tire and a method of producing the same are disclosed. This sealant composition is crosslinking-reaction type and comprises (A) at least one rubber, (B) a tackifier, (C) an acryloyl or methacryloyl group-containing polymerizable unsaturated compound, (D) a filler and (E) a photopolymerization initiator. In the production of the sealant composition, the component (A) is first reacted with the component (C) and then kneaded with the components (B), (D) and (E).

3 Claims, No Drawings

SEALANT COMPOSITIONS AND METHOD OF PRODUCING THE SAME

This invention relates to a crosslinking-reaction type sealant composition for a puncture-sealing tire, which can prevent the leakage of air filled in a tire even when puncturing objects scattered on road surface such as nails and a like pass through a tread portion of the tire during the running thereof, and a method of producing the same.

Based on the idea that a tacky rubber layer prevents the leakage of filled air by sealing against a puncturing object even when the puncturing object passes through a thread portion of the tire during the running thereof, and that even when the puncturing object is removed out from the tread portion by centrifugal force based on the rotation of the tire during the running thereof, the tacky rubber sealant flows into the puncturing hole and retains airtightness of the tire, many puncture-sealing pneumatic tires which comprise a thin rubber layer having a tackiness as a sealant for the prevention of tire puncture on its inner surface have been manufactured. However, satisfactory performances have not yet been obtained since besides the performance of sealing against the puncturing object, the sealant flows into and unevenly accumulates near the center of the tread due to the heat build-up of the tire, the viscosity of the sealant is reduced due to temperature rising, and the tire balance is lost and the safety is reduced due to centrifugal force caused by rotation of the tire. On the other hand, if it is intended to make the sealant hard in order to reduce the flowability, the sealant has a tendency of reducing the tackiness performance against the puncturing object. Moreover, when the tire provided with such a sealant is left to stand outdoors without mounting on a rim of a wheel, the sealant absorbs water such as rain or the like and causes reduction of tackiness. As a result, the sealant is striped from the inner surface of the tire during the running thereof.

In order that a sealant for the prevention of puncture practically maintains satisfactory performances, such a sealant must not only has an excellent tackiness and no fluidity phenomenon but also must satisfy various requirements such as maintenance of expected performances at high and low temperatures, low water absorption, no oxidative degradation by air under high temperature and pressure, no bad influence upon material of each part constituting the tire and the like. In order to develop such performances, there have hitherto been proposed various methods. For instance, there are typically (1) a method wherein a peroxide-crosslinking type sealant composition is dissolved in a solvent and then sprayed into the inner surface of the tire under heating, (2) a method wherein a two layer structure of an inner liner and a sealant layer located thereinside is formed in the tire building, (3) a method wherein a sealant layer is applied to the inside of the tire and further a hard and fluidity resistant material is applied thereon as a cover, and the like. All of materials obtained by these conventional methods are fairly excellent in fluidity resistance, but have some drawbacks. That is, in method (1), solvent is used for the spraying, so that the working atmosphere becomes contaminated such that in the production step a composition containing a peroxide has a very short pot life. In method (2), the application of the sealant layer is difficult in the tire building, so that it is necessary to reduce the sealing property to a certain extent in order to make such an application possible, while there are manufacturing and technical problems such as foaming of tackifier or the like in the sealant composition and so on due to high temperature at vulcanization. Further, method (3) is fairly improved as compared with methods (1) and (2) but has a problem in productivity owing to the necessity of at least two steps for application of sealant. Moreover, when the hard layer exists in the inside of the tire as described in methods (2) and (3), there is a tendency of somewhat reducing the sealing property after the pulling out of puncturing objects such as nail or the like.

The inventors have made various studies with respect to the development of sealant compositions eliminating the aforementioned drawbacks of the prior art, satisfying various requirements as a sealant for the prevention of tire puncture, having a good productivity and not contaminating the working atmosphere by solvent and the like, and as a result the invention has been accomplished. That is, the sealant composition according to the invention is a crosslinking-reaction type and comprises (A) at least one rubber selected from ethylene-propylene-diene terpolymer rubber, butyl rubber, halogenated butyl rubber and conjugated diene butyl rubber, (B) a tackifier, (C) an acryloyl or methacryloyl group-containing polymerizable unsaturated compound, (D) a filler and (E) a photopolymerization initiator. Furthermore, the invention lies in a method of producing sealant compositions, which comprises reacting (A) at least one rubber selected from ethylene-propylene-diene terpolymer rubber, butyl rubber, halogenated butyl rubber and conjugated diene butyl rubber with (C) an acryloyl or methacryloyl group-containing polymerizable unsaturated compound in the presence of an alkylhypohalite to produce a polymer having an $\alpha,\beta$-unsaturated carboxylate group represented by any one of the following general formulae:

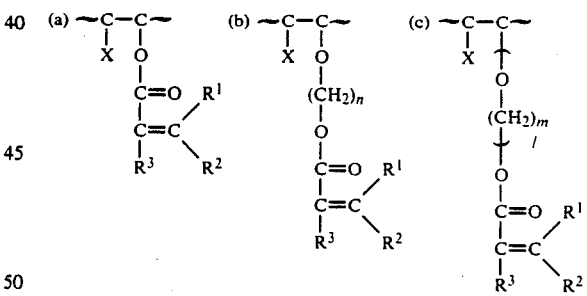

wherein X is a halogen atom, each of $R^1$, $R^2$ and $R^3$ is a hydrogen atom or a hydrocarbon residue containing 1 to 10 carbon atoms, n is an integer from 2 to 5, m is an integer from 1 to 4 and l is an integer from 1 to 30; and kneading the resulting polymer with (B) a tackifier, (D) a filler and (E) a photopolymerization initiator.

According to the invention, the component (A) may optionally be selected from at least one of ethylene-propylene-diene terpolymer rubber, butyl rubber, halogenated butyl rubber and conjugated diene butyl rubber, each being produced by the conventional method.

As component (B), use may be made of one or more of liquid tackifiers such as liquid polybutene, liquid polyisobutylene, liquid polypentene, liquid polyisobutyleneisoprene, liquid polyisobutylene-butadiene and the like, or petroleum hydrocarbon resin tackifiers such as aliphatic petroleum resin, aromatic petroleum resin, alicyclic petroleum resin and the like, or natural tackifiers.

As component (C), use may be made of one or more compound selected from acrylic acid, methacrylic acid and derivatives thereof. In general, the derivatives of acrylic or methacrylic acid are esters and amides. An alcohol residue of the ester includes, for example, cyclohexyl group, tetrahydrofurfuryl group, aminoethyl group, 2-hydroxyethyl group, 3-hydroxyethyl group and the like in addition to alkyl groups such as methyl group, ethyl group, dodecyl group and stearyl group. Furthermore, there may be used esters of acrylic acid or methacrylic acid with ethylene glycol, triethylene glycol or polyethylene glycol. On the other hand, acrylamide and N-diacetonacrylamide may be used as an amide.

As component (D), use may be made of silica (white carbon), clay, mica, glass short fiber and the like.

As component (E), use may be made of at least one initiator for ultraviolet light selected from benzoin, benzophenone, benzoin ethyl ether, benzoin isopropyl ether, dibenzyl, benzyldimethyl ketal, azobisisobutyronitrile, diacetyl and the like. Moreover, mention may be made of combinations of N,N-dimethylamino benzaldehyde/1,2-benzanthraquinone, Micheler's ketone/camphorquinone, methylene bisdimethylaniline/benzyl and the like as an initiator for visible light.

In the sealant composition, 90 to 65 parts by weight of the component (B) is mixed with 10 to 35 parts by weight of the component (A) and further not more than 10 parts by weight of the component (C), 5 to 30 parts by weight of the component (D) and not more than 10 parts by weight of the component (E) are added to 100 parts by weight of a total of the components (A) and (B). According to the invention, when the amount of the component (A) is less than 10 parts by weight, the fluidity resistance is poor, while when it exceeds 35 parts by weight, the sealing property is poor. Particularly, the amount of component (A) is preferable within a range of 15 to 30 parts by weight, so that the amount of component (B) is preferable within a range of 85 to 70 parts by weight. Furthermore, component (D) is preferably used in an amount of 10 to 20 parts by weight per 100 parts by weight of a total of components (A) and (B). When the amount of component (E) exceeds 10 parts by weight, the light transmission property becomes poor. The preferable amount of the component (E) is not more than 5 parts by weight.

In order to improve the storage stability, not more than 5% by weight of a well-known polymerization inhibitor may be added to the sealant composition. As the polymerization inhibitor, mention may be made of hydroquinone, hydroquinone monomethyl ether, p-benzoquinone and the like.

The sealant composition according to the invention is produced by kneading the above mentioned components by means of a roll mill, kneader, Banbury mixer, extruder or the like. In the case of the polymer having an α,β-unsaturated carboxylate group, it is better that component (A) is first reacted with component (C) and then the resulting polymer is kneaded with components (B), (D) and (E). That is, a rubber of the component (A) is reacted with an acryloyl or methacryloyl group-containing polymerizable unsaturated compound of component (C) such as acrylic acid or methacrylic acid in the presence of an alkylhypohalite such as t-butylhypochlorite or the like to produce a polymer having an α,β-unsaturated carboxylate group represented by any one of the following general formulae:

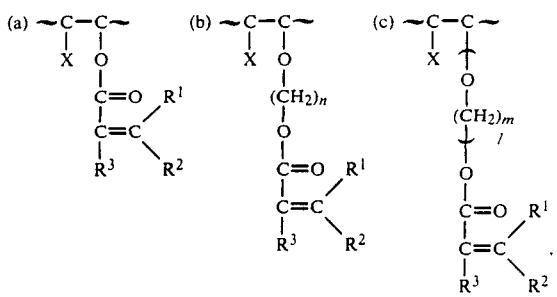

wherein X is a halogen atom, each of $R^1$, $R^2$ and $R^3$ is a hydrogen atom or a hydrocarbon residue containing 1 to 10 carbon atoms, n is an integer from 2 to 5, m is an integer from 1 to 4 and l is an integer from 1 to 30.

When the sealant composition according to the invention is used to form a puncture preventive layer for a tire, it may be dissolved in a solvent and applied to an inner surface of the tire. However, it is preferable that the sealant composition is heated to make its viscosity low and coated on the inner surface of the tire as a coating layer having a desired thickness of, for example, about 1.5 to 4.0 mm by means of a doctor knife. In the latter case, the heated sealant composition is high in the tackiness, so that it can be applied to the inner surface of the tire without wiping out a talc from the inner surface of the tire because it is usually required to clean the inner surface of the tire. Thereafter, the crosslinking reaction is carried out by irradiating a light. As a light source, mention may be made of ones having an emission wavelength at visible-ultraviolet region, such as high pressure mercury lamp, mercury-xenon lamp, halogen lamp, chemical lamp and the like.

Furthermore, the sealant composition can be fabricated into a predetermined shape by means of a press, T-die, extruder or the like. The thus shaped sealant is crosslinked by irradiating a light on a release paper, which can be applied to the inner surface of the tire. In the formation of the sealant layer inside the tire, the above mentioned mounting method or doctor knife coating method does not degrade the working atmosphere at the production stage as compared with the usually used method of dissolving the sealant composition in the solvent and spraying it, and has a very long pot life because the crosslinking reaction does not occur until the irradiation of light.

The sealant composition according to the invention exhibits satisfactory performances at a single layer structure, and is simple in the production step and excellent in the tackiness, and forms a network structure by polymerization reaction under the irradiation of light to completely prevent the movement even at high temperature.

That is, the sealant composition crosslinked under the irradiation of light has a viscosity of $5 \times 10^3 - 5 \times 10^4$ poises at a temperature of 80° C. and a shearing speed of 100 sec$^{-1}$ and is very rich in the tackiness and has a crosslinked structure, so that it is low in the temperature dependence of viscosity and does not exhibit the movement even at high temperature. Further, the conventional sealant is high in the water absorption due to the absence of the network structure, while according to the invention the water absorption of the filler is restrained to a low value owing to the crosslinked structure of the sealant.

The invention will be described in detail with the following example.

EXAMPLE (1) In a kneader were thoroughly kneaded 200 g of conjugated diene butyl rubber (made by Exon Co., Ltd.), 600 g of polybutene 300 R (made by Idemitsu Sekiyu Kagaku K.K.), 96 g of silica (VN-3, made by Nippon Sirika K.K.), 16 g of dimethacrylic acid 1,3-butylene (made by Mitsubishi Rayon K.K.), 6.4 g of benzoin ethyl ether (made by Seiko Kagaku K.K.) and 3.2 g of 2,6-di-t-butyl-p-cresol (made by Seiko Kagaku K.K.). The viscosity of the resulting composition was $5.5 \times 10^3$ poises as measured at a temperature of 80° C. and a shearing speed of 100 sec$^{-1}$. This composition was called as a sealant A.

(2) In a kneader were thoroughly kneaded 160 g of brominated butyl rubber (made by Exon Co., Ltd.), 640 g of polybutene 300 R, 96 g of silica, 24 g of trimethylol propane triacrylate (made by Shinnakamura Kagaku K.K.), 6.4 g of benzoin isopropyl ether and 3.2 g of 2,6-di-t-butyl-p-cresol. The viscosity of the resulting composition was $2.8 \times 10^3$ poises at a shearing speed of 100 sec$^{-1}$ and $1.0 \times 10^4$ poises at a shearing speed of 10 sec$^{-1}$ as measured at a temperature of 80° C. This composition was called as a sealant B.

(3) 200 g of conjugated diene butyl rubber was masticated by means of a roll mill at a temperature of 50° C., to which was added dropwise 5.8 g of methacrylic acid (one molecule per molecular weight of conjugated diene butyl rubber of 3,000) and further added 7.3 g of t-butyl hypochlorite (equimolar amount per methacrylic acid). The resulting mixture was kneaded for 10 minutes to obtain a modified conjugated diene butyl rubber. After the completion of the reaction, the rubber was dissolved in toluene and poured into methanol, from which a precipitated polymer was taken out and dried and then dissolved in toluene. The infrared ray absorption spectrum of the resulting solution showed wave numbers of 1,710 cm$^{-1}$ assigned to carbonyl group and 1,160 cm$^{-1}$ assigned to ester group.

In a kneader were thoroughly kneaded 200 g of the modified conjugated diene butyl rubber, 600 g of polybutene 300 R, 96 g of silica, 6.4 g of benzoin isopropyl ether and 3.2 g of 2,6-di-t-butyl-p-cresol. The viscosity of the resulting composition was $2.8 \times 10^3$ poises at a shearing speed of 100 sec$^{-1}$ and $8.2 \times 10^2$ poises at a shearing speed of 1,000 sec$^{-1}$ as measured at a temperature of 100° C. This composition was called as a sealant C.

Property test

Each of the above three sealants was passed through a vent tuber heated at 50° C. to remove air bubbles from the sealant and coated on an inner surface of a tire (steel belt radial tire of a size 165-SR-13, made by Bridgestone Tire Co., Ltd.) as a sealant layer having a width of 11 cm and a thickness of 3 mm by means of a doctor knife heated at 100° C. The sealant layer was crosslinked so as to obtain a predetermined viscosity by irradiating a light to the inner surface of the tire with a high pressure mercury lamp. As the viscosity was measured at 100° C. after the crosslinking, the sealant A was $1.3 \times 10^5$ poises at a shearing speed of 10 sec$^{-1}$ and $2.2 \times 10^4$ poises at a shearing speed of 100 sec$^{-1}$, a sealant B was $7.0 \times 10^4$ poises at the shearing speed of 10 sec$^{-1}$ and $1.3 \times 10^4$ poises at the shearing speed of 100 sec$^{-1}$, and the sealant C was $1.0 \times 10^5$ poises at the shearing speed of 10 sec$^{-1}$ and $2.0 \times 10^4$ poises at the shearing speed of 100 sec$^{-1}$. The following tests were made with respect to the puncture-sealing tires obtained by the above method.

(1) Fluidity test of sealant during high-speed running

Each of the above three tires was assembled into a rim and inflated to an internal pressure of 2.7 kg/cm$^2$, which was run on a test drum at a speed of 140 km/hr under a load of 225 kg for 2 hours. Thereafter, the tire was disassembled from the rim and then the fluid state of the sealant was examined. As a result, all of the sealants A–C held the original state before running without causing movement.

For the comparison, three tires were manufactured in the same manner as described above except that the sealant was not exposed to a light and then subjected to the same test as described above. In this case, the sealant exhibited significant movement toward the central portion at the inner surface of the tire.

(2) Sealing property during the running at a nailed state

Each of the same three tires as used in the test (1) was again assembled into a rim and inflated to an internal pressure of 1.7 kg/cm$^2$. Then, 24 nails were inserted in tread center region and shoulder region of the tire at block portion and groove portion of tread pattern so as to penetrate into the inside of the tire by using three kinds of iron nails, first kind of which having a diameter of 2.4 mm and a length of 51 mm, second kind of which having a diameter of 2.7 mm and a length of 64 mm, and third kind of which having a diameter of 3.4 mm and a length of 76 mm. After these tires were left to stand for a given time, a soap solution was applied to the nailed portions to examine air leakage from the nailed portion. As a result, the air leakage was not observed in all of the three tires and the sealing property was perfect.

Then, each of these three tires was run on a test drum at a speed of 60 km/hr under a load of 360 kg over a distance of 1,500 km. After the running, the tire was taken out from the drum and left to stand for some time, during which the internal pressure was measured and the initial internal pressure of 1.7 kg/cm$^2$ was confirmed to be maintained without change. Furthermore, the air leakage from the nailed portion was not observed by testing with the soap solution. Moreover, even when all the nails were pulled out from the tire, there was observed no air leakage from puncturing-holes because these holes were completely sealed with the sealant.

(3) Water absorbing property of sealant

The sealant A or B was shaped into a specimen of $30 \times 30 \times 3$ mm, mounted to a stainless steel net and crosslinked by the irradiation of a mercury lamp. These specimens were immersed in a distilled water at room temperature for 10 days and then the water absorption thereof was measured. As a result, the crosslinked sealant A had a water absorption of 2.5% by weight, while the crosslinked sealant B had a water absorption of 1.5% by weight, so that both the sealants hardly absorbed water. On the other hand, the water absorptions of the sealants A and B before crosslinking were 13% by weight and 3.0% by weight, respectively.

As apparent from the above results, the sealant compositions according to the invention are crosslinked by light irradiation and develop satisfactory performances as a sealant for tire.

What is claimed is:

1. A method of producing a crosslinking-reaction type sealant composition for a puncture-sealing tire, which comprises reacting 10-35 parts by weight of component (A) at least one rubber selected from the group consisting of ethylene-propylene-diene terpolymer rubber, butyl rubber, halogenated butyl rubber and conjugated diene butyl rubber with not more than 10 parts by weight of component (C) an acryloyl or methacryloyl group containing polymerizable unsaturated compound in the presence of an alkyl-hypohalite to produce a polymer having an $\alpha,\beta$-unsaturated carboxylate group represented by any one of the following general formulae:

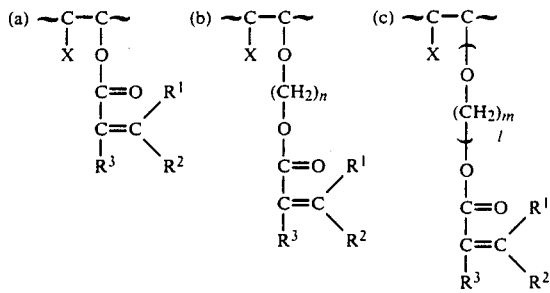

wherein X is a halogen atom, each of $R^1$, $R^2$ and $R^3$ is a hydrogen atom or a hydrocarbon residue containing 1 to 10 carbon atoms, n is an integer from 2 to 5, m is an integer from 1 to 4 and l is an integer from 1 to 30; and kneading the resulting polymer with 90-65 parts by weight of (B) a tackifier, wherein said tackifier is liquid polybutene, 5 to 30 parts by weight of component (D) a filler and not more than 10 parts by weight of (E) a photopolymerization initiator, based on 100 parts by weight of a total of components (A) and (B).

2. The method of producing a crosslinking-reaction type sealant composition for the puncture sealing tire as claimed in claim 1, wherein said acryloyl or methacryloyl group-containing polymerizable unsaturated compound (C) is selected from the group consisting of acrylic acid, methacrylic acid, esters of acrylic acid, esters of methacrylic acid, amides of acrylic acid, and amdies of methacrylic acid.

3. The method of producing a crosslinking-reaction type sealant composition for the pucture sealing tire as claimed in claim 1, wherein said filler (D) is selected from the group consisting of silica, clay, mica, and glass short fiber.

* * * * *